United States Patent [19]

Hoffman

[11] 3,847,516
[45] Nov. 12, 1974

[54] APPARATUS FOR EXTRUDING MELTED POLYMERIC THERMOPLASTIC MATERIALS

[75] Inventor: Edward P. Hoffman, Rochester, N.Y.

[73] Assignee: Eastman Kodak Company, Rochester, N.Y.

[22] Filed: Nov. 24, 1972

[21] Appl. No.: 309,330

Related U.S. Application Data

[62] Division of Ser. No. 140,087, May 4, 1971, Pat. No. 3,734,984.

[52] U.S. Cl..................... 425/72, 425/135, 425/224
[51] Int. Cl............................................. B29d 7/02
[58] Field of Search ............ 425/72, 135, 224, 223, 425/227, 169; 236/44; 34/46, 50

[56] References Cited
UNITED STATES PATENTS

| | | | |
|---|---|---|---|
| 2,437,680 | 3/1948 | Cornelius | 34/50 |
| 3,112,528 | 12/1963 | Czerkas | 425/224 X |
| 3,277,227 | 10/1966 | Kesseler et al | 425/72 X |
| 3,502,757 | 3/1970 | Spencer | 425/227 X |
| 3,686,771 | 8/1972 | Schone et al. | 34/50 |

*Primary Examiner*—J. Spencer Overholser
*Assistant Examiner*—David S. Safran
*Attorney, Agent, or Firm*—H. M. Chapin

[57] ABSTRACT

A molten polymeric plastic such as a sheet of poly (ethylene terephthalate) is extruded under pressure through an orifice while impinging a blast of clean hot air or other gas against the extruded product at the instant it leaves the orifice. Water vapor is introduced into the gas, as by steam injection or water sprays, so as to maintain its humidity at a level corresponding to a dew point of at least 35°F., and preferably 50°–80°F. When casting a sheet of film onto a wheel, die lines are avoided by this process. The apparatus comprises a humidistat for monitoring the humidity of the air fed to the blast, a valve for controlling the injection of steam into the air, and a control system between the humidistat and valve for automatically maintaining the desired humidity.

4 Claims, 1 Drawing Figure

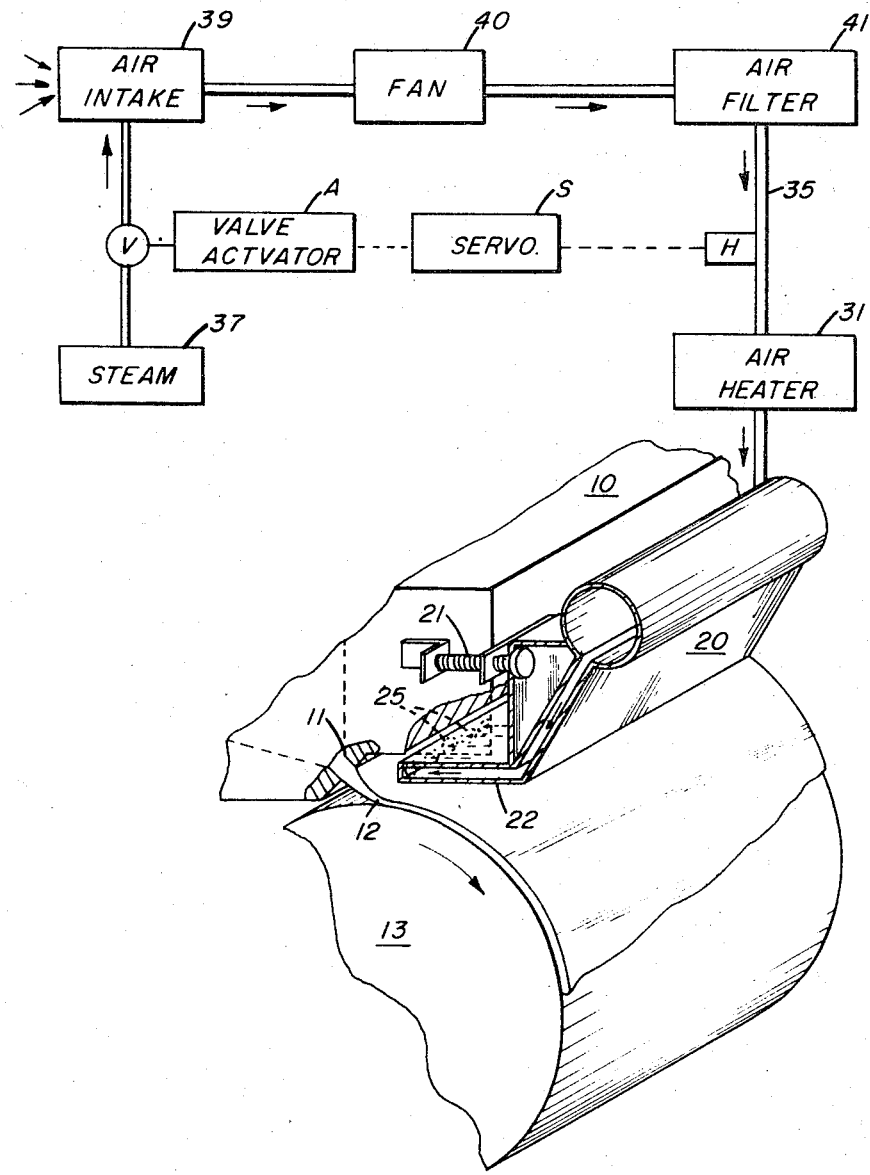

APPARATUS FOR EXTRUDING MELTED POLYMERIC THERMOPLASTIC MATERIALS

This is a division of application Ser. No. 140,087 filed May 4, 1971, now U.S. Pat. No. 3,734,984.

BACKGROUND OF THE INVENTION

1. Field of the Invention

This invention relates to extrusion of melted polymeric thermoplastic materials, and particularly to the casting of sheeting or film material.

2. The Prior Art

The extrusion of thermoplastic films and sheets through a restricted die opening is often attended by a defect in the surface of the cast sheet or film known as a die line which may extend continuously for hundreds of feet. Such long die lines have been cured by the process described and claimed in U.S. Pat. No. 3,502,757 granted Mar. 24, 1970 to Arthur W. Spencer, and assigned to Eastman Kodak Company like the present application. Basically, that patent describes a process for preventing long continuous die lines which comprises impinging a blast of clean gas such as air against the full width of at least one surface of the die lip and the extrudate at the instant of its exposure to atmospheric environment. The theory is discussed in much greater detail in U.S. Pat. No. 3,502,757, which is incorporated by reference herein.

The process has been practiced successfully, and the important advantages as described have been obtained except on infrequent occasions when short random die lines unexpectedly have intermittently appeared in the product despite the use of air. Such occasions have generally occurred during cold winter weather. Unfortunately, even infrequent periods of malfunctioning can result in the production of large amounts of unacceptable product which must be scrapped. Up until now, a solution to this problem of occasional malfunctioning has evaded concerned engineers and other scientists.

SUMMARY OF THE INVENTION

I have now found, surprisingly, that consistently satisfactory production of extruded polymeric thermoplastic materials can be secured, without such occasional periods of malfunctioning, by assuring that at all times the gas blast contains sufficient water vapor to have a dew point of at least 35°F and up to 80°F, and advantageously between 50° and 80°F.

When the ambient atmosphere from which the air blast is drawn naturally has a high dew point such as 50°F or higher, as may occur in humid summer weather, it can be used directly without further humidification. However, when the ambient air has a low dew point, as in winter, I add water vapor to bring the dew point up to the desired level. This is advantageously done by injecting controlled quantities of steam into the air as it flows in a stream to the melt extrusion machine, and varying the amount of steam as necessary to secure the desired humidity. Instead of steam injection, water vapor can be supplied by passing the air through controlled sprays of water.

Manual control of humidification can be employed, with an operator regulating the flow of steam or water sprays as needed to maintain the desired humidity constantly. However, mass production methods require automatic control of humidity, and this is accomplished by continuously monitoring the humidity of the flowing gas stream with a humidistat, and automatically regulating the supply of steam or other source of water vapor into the gas by controlling a valve in response to a signal from the humidistat.

THE DRAWING

In the drawing, the single FIGURE comprises a perspective view, partly in section, of a melt casting machine for producing sheeting, together with a schematic block diagram of apparatus for automatically controlling humidity of the gas.

THE SPECIFIC EMBODIMENTS

Referring now to the drawing, a molten highly polymeric thermoplastic such as a polycarbonate, a polyamide, or a polyester such as poly(ethylene terephthalate) is extruded under pressure from a die or hopper 10 having a relatively long and narrow discharge orifice 11 to form a thin sheet 12. The extruded sheet 12 is then deposited onto the polished surface of a chilled rotating casting wheel 13. Within one revolution of the casting wheel the sheet is cooled enough to be stripped therefrom for further processing as is well known.

As shown in the drawing, extrusion dies or hoppers employed for casting film or sheeting may have their discharge orifice 11 arranged to discharge the extrudate at substantially a 45° angle with respect to the tangent at the top surface of the casting wheel 13. Immediately upon extrusion from the orifice the polymer swells momentarily during the melt expansion phenomena as illustrated in exaggerated form in the drawing, and then is drawn down into the thinner desired thickness by the wheel speed.

Clean humidified heated gas, advantageously humidified air, is accurately impinged at the polymeric extrudate at the instant of exposure to atmospheric environment. The humidified air is fed into a distribution plenum 20 fixed to the die by an adjusting mechanism 21 so that it can be adjusted to and from the extrusion orifice. This plenum 20 terminates in a narrowed-down air sweep nozzle portion 22 which extends substantially the full width of the extruded sheet and is disposed substantially parallel to the die and the uppermost surface of the sheet 12 of extrudate deposited on the wheel. While different types of openings can be provided in the end of the air sweep nozzle 22 to obtain a proper and uniform distribution of air across the entire length of the discharge orifice 11 of the die, it has been found that 1/16 inch holes 25 on 3/32 inch centers perform satisfactorily.

The humidified air must issue from the air sweep nozzle at as high a velocity as is practical. The maximum velocity of the air will depend upon the distance the nozzle is spaced from the extruded sheet and upon the thickness and character of the extruded sheet. For instance, the air issuing from the air sweep nozzle should not impinge upon the sheet in such a manner and with such force as to deform the surface of the sheet. Also, it will be understood that thicker sheets of extrudate can withstand higher impingement velocities of the air than thin sheets of extrudate without being broken thereby or having its exposed surface adversely deformed by the air stream. It is also conceivable that the physical properties of the particular polymer being extruded will to some extent dictate the velocity of air which may be tolerated. The distance of the air sweep nozzle from the discharge orifice of the die will also affect the velocities of air which can be used.

Accordingly, in order to accommodate the extrusion of different polymers at different thicknesses the air sweep nozzle 22 should be adjustably mounted on the die, or some other support, so that its discharge orifice or orifices can be adjusted from ¼ inch to 5 inches from the die discharge orifice. The volume of humidified air supplied to the plenum 20 should be adjusted so that the linear velocities of the air issuing from the air sweep nozzle can be adjusted in accordance with the particular type and thickness of the extrudate being handled.

Also, means 31 should be provided to heat the humidified air issuing from the air sweep nozzle to control its temperature within a certain range. This can be done by placing thermocouple controlled heaters in the plenum chamber, or by heating the air prior to its introduction into the plenum. A preferred range of temperatures for the humidified air for poly(ethylene terephthalate) is from 400°F to 650°F, advantageously about 550°F.

It will be appreciated that the wider the extruded sheet, the larger the air distribution plenum 20 and air sweep nozzle 22 that will be required. Accordingly, the volume of humidified air fed into the plenum to produce the desired linear velocities of the air issuing from the air sweep nozzle will vary with the width of the distribution plenum and the design of the air sweep nozzle associated therewith. For this reason the values of the volume of air fed into the distribution plenum has little significance so far as the process is concerned, but it is more significant to consider the linear velocity of the air issuing from the air sweep nozzle. While, as mentioned above, the linear velocity of the air issuing from the air sweep nozzle may vary depending upon the type of polymer being extruded, the thickness of the extrudate and the spacing of the air sweep nozzle from the extrusion die, I have found that in the production of 4 to 2½ mil poly(ethylene terephthalate) sheeting, and with the air sweep nozzle spaced approximately ½ inch from the extrusion die orifice, a preferred range of linear velocities is 4,000-7,000 feet per minute. These linear velocities are calculated at the air sweep nozzle but will, in fact, remain the same for approximately ⅜ of an inch of travel. The velocity of air which is actually impinging upon the extrusion orifice will be in this range or possibly somewhat less depending upon the spacing of the air sweep nozzle.

Rather than leaving the casting wheel open to allow the air to be swept away from the environs of the extrusion die orifice solely by deflection of the air from the edge of the die orifice and the surface of the extruded sheet, it has been found helpful in some cases, e.g., where wide sheets are being extruded, to provide exhaust facilities around the peripheral and "back wash" areas of the die to carry the air away from the casting area.

An air sweep nozzle can also be positioned on the other side of the extruded sheet, for example when the die extrudes vertically onto the top of the casting wheel rather than at an angle as shown in the drawing.

In order to assure that the apparatus and process described above will operate consistently at all times of the year, to reduce the incidence of both long continuous die lines and short intermittent randomly distributed die lines, I have discovered that the gas supplied to plenum 20 should at all times contain sufficient water vapor to have a dew point of 35°F or higher, such as up to 80°F, and advantageously 50°–80°F. This is preferably done by installing an adjustable humidistat H in air supply conduit 35 upstream of air heater 31 to continuously monitor the humidity of the air, and sending an electrical or pneumatic signal to a servo S which controls a pneumatic valve actuator A operatively coupled to a steam control valve V which regulates the flow of steam from a source 37 to an air intake 39 to reduce or increase steam flow as needed to hold the desired humidity. The air thus humidified then is drawn through a fan 40 and passed through an air filter 41 before entering air heater 31 and plenum 20.

A conventional humidistat H can be used, such as a Foxboro DewCel humidistat sold by the Foxboro Instrument Co. as Model M27-10-624. Humidistat H can as well be located elsewhere in the air supply system, as on either side of fan 40. Servo S can be a conventional controller such as a Bristol controller Model OT 624C-1A. A Minneapolis Honeywell steam control valve and actuator A, Model V5011C1029 can be used.

The Foxboro DewCel humidistat comprises a tube coated with hygroscopic lithium chloride, and having two gold wires wrapped around the tube out of contact with one another, and connected into an electrical circuit. The electrical conductivity of the lithium chloride varies directly with the amount of water absorbed thereon, which in turn varies directly with the dew point of the air in conduit 35. The temperature of the tube varies directly with the current flowing in the lithium chloride coating, e.g., between 79° and 173°F, and it is the signal generated by a thermocouple which responds to a selected temperature of the tube that is transmitted to servo S for controlling valve actuator A.

The air intake normally is taken from the ambient atmosphere in the interior of the building which houses the hot melt casting apparatus, and normally has a dew point below 50°F. In the winter its dew point may be as low as 20°–30°F.

During a period in the winter when the ambient air had a dew point ranging between 20° and 30°F, the air supplied to plenum 20 while hot melt casting poly(ethylene terephthalate) sheet 2.5 mil thick and 18 ⅝ inches wide was humidified by injection of steam at a pressure of 0.25 psi in response to signals generated by humidistat H to maintain humidity at a level corresponding to a dew point of about 52°F. In the humidified air the weight of water based on a pound of dry air was 2.5 times as much as in the intake air. The casting machine operated for 10 days without the need to shut down or cut back for unacceptable die lines in the product. Under similar severe conditions previously, without added humidification, unacceptable short intermittent randomly distributed die lines were found in much of the product, making it scrap.

While air has been described above, it is evident that nitrogen or carbon dioxide can also be used, and that the described humidification technique also can be used with such gases.

The principles of the invention have been described as applied to the extrusion of a sheet through a long narrow die orifice, but it is evident that the same principles apply to the extrusion of hot thermoplastics through die orifices of other shapes. For example, they will apply to the extrusion of filaments through orifices of spinnerets, which may be generally circular.

I am not certain of the reasons why the problem occurs, nor why humidifying the gas blast provides greatly improved results. It is my theory, however, that degradation products from the extrudate may momentarily wet small areas on the extrusion die adjacent its orifice, thus causing a short die line corresponding to each wet area. The wetted areas are believed to change position across the die so that only short intermittent die lines occur rather than the long continuous die lines characteristic of production without any gas blast whatsoever. The water vapor in the gas blast is believed to react with and hydrolyze any degradation products of the thermoplastic, which then become incapable of wetting the die surface, thus obviating the occurrence of short intermittent die lines.

The invention has been described in detail with particular reference to preferred embodiments thereof, but it will be understood that variations and modifications can be effected within the spirit and scope of the invention.

I claim:

1. An apparatus for preventing the occurrence of random die lines in an extruded thermoplastic product comprising in combination:

an extrusion die for a thermoplastic product;

means for directing gas heated to a desired temperature against the thermoplastic product as it leaves said die;

means for supplying said heated gas to said directing means;

means in communication with said supplying means upstream of said directing means for increasing the humidity of said heated gas when it falls below a desired level;

means within said supplying means for sensing the humidity of said heated gas and cooperating with said humidity increasing means.

2. An apparatus in accordance with claim 1 wherein said humidity increasing means comprises a source of water vapor and flow control means for controlling the flow of water vapor into said supplying means.

3. An apparatus in accordance with claim 2 wherein said flow control means is a valve for controlling the flow of water vapor, and further comprising a servo control connected between said sensing means and said valve.

4. An apparatus in accordance with 3 1 wherein said extrusion die has a long narrow orifice for extruding said product as a sheet, wherein said apparatus also comprises a casting wheel adjacent said die for receiving said sheet, and wherein said directing means is so constructed and arranged as to direct said heated gas against the full width of at least one surface of said sheet.

* * * * *